April 1, 1958  J. K. DARIN ET AL  2,829,040
PETROLEUM PITCH FERTILIZER AND PROCESS FOR ITS PREPARATION
Filed March 27, 1956
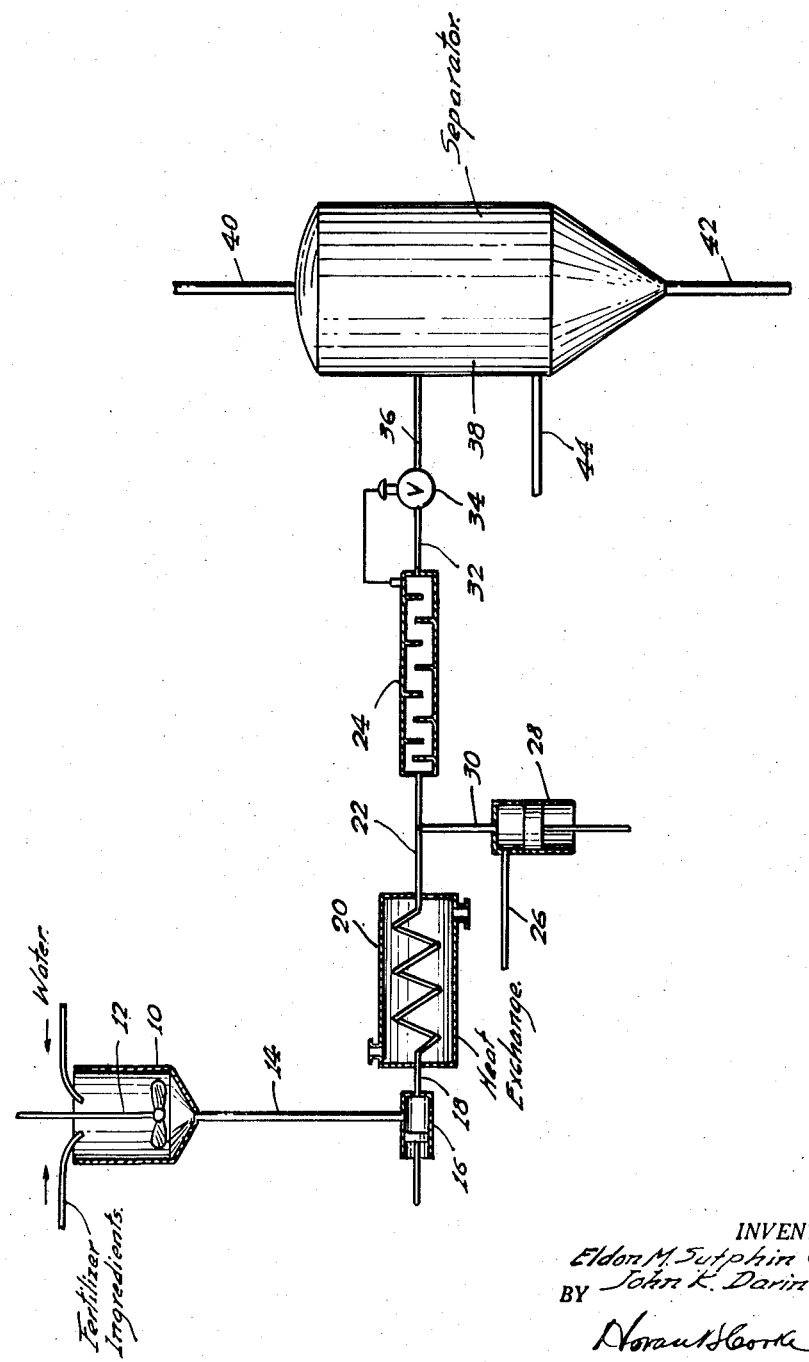
INVENTORS.
Eldon M. Sutphin and
BY John K. Darin.
ATTORNEYS

United States Patent Office 2,829,040
Patented Apr. 1, 1958

2,829,040

PETROLEUM PITCH FERTILIZER AND PROCESS FOR ITS PREPARATION

John K. Darin, Elizabeth, N. J., and Eldon M. Sutphin, Verona, Pa., assignors to Gulf Research & Development Company, Pittsburgh, Pa., a corporation of Delaware Application March 27, 1956, Serial No. 574,169

12 Claims. (Cl. 71—25)

This invention relates to a novel fertilizer and a method for its preparation.

Many of the inorganic chemicals used in compounding fertilizers are very soluble in water and are rapidly leached from the soil. The increased use of sources of nitrogen derived from ammonia in place of organic nitrogen has aggravated the loss of fertilizer components resulting from their high solubility. The high solubility of some of the inorganic chemical fertilizer ingredients is also a disadvantage in causing the plants to be exposed to short periods of concentrations of the chemicals sufficiently high to cause extensive damage. It is desirable to provide a porous friable fertilizer which will slowly release the soluble inorganic chemicals to minimize loss of the chemicals.

Some of the ingredients in mixed fertilizers, notably some of the compounds used as a source of phosphates are of only slight solubility in water. In order to assist the dissolution of those ingredients at a rate that will support rapid growth of the plant life they are often ground into a fine powder in commercial fertilizers. The fine particle size aggravates physical loss of the fertilizer caused by high winds or heavy rains.

Some of the ingredients that are used in the preparation of commercial fertilizers are highly hygroscopic. They become sticky when stored in humid atmospheres and cause the fertilizer to cake, thereby making difficult their use in fertilizer spreading or drilling machines. The moisture taken up by the hygroscopic chemicals, in combination with the corrosive nature of some of the fertilizer ingredients, causes extensive damage to the paper bags in which the fertilizers are usually packed. Hence, it is desirable to provide a fertilizer which remains dry and free flowing even when stored for long periods in humid atmospheres.

This invention resides in a free-flowing fertilizer and a method of preparing it in which fertilizer ingredients are disseminated in a finely divided state through a highly expanded, porous, friable, petroleum pitch. The novel fertilizer is prepared by first mixing the petroleum pitch with an aqueous slurry of fertilizer ingredients at a temperature and pressure high enough to keep the pitch and water in the liquid state. The resultant suspension of molten pitch, water, and fertilizer ingredients is flashed from the high temperature and pressure to substantially atmospheric pressure whereupon evaporation of the water absorbs heat from the pitch and cools it to form a solid, finely divided, product with the fertilizer ingredients substantially uniformly distributed therein.

The single figure of the drawing is a diagrammatic flow sheet illustrating apparatus suitable for use in the preparation of the fertilizer of this invention.

The fertilizer ingredients disseminated through the pitch particles are those usually used in the preparation of commercial fertilizers. The only limitation on the fertilizer ingredients is that they should be stable at 450° F. or higher, the temperature of mixing the molten pitch and water prior to flashing, or if they decompose will not decompose to form compounds that are highly volatile, insoluble, or will otherwise be lost as fertilizer ingredients. Moreover the fertilizer ingredients should not be so volatile that they will evaporate from the solids when the pressure on the hot mixture is reduced, even if there is no decomposition. Nitrogen, phosphorus, and potassium, the primary ingredients of most commercial fertilizers, are the principal ingredients of the fertilizers of this invention. Ratios of the ingredients to one another are determined by the usual considerations in the compounding of fertilizers.

Suitable nitrogen compounds that can be incorporated in the fertilizer are sodium nitrate, nitrate of soda, potash, calcium nitrate, ammonium sulfate, etc. Organic nitrogen compounds such as animal and plant by-products can also be used. Compounds such as ammonia and ammonium nitrate are not satisfactory because of their high volatility or lack of stability.

The principal sources of phosphorus in the fertilizer are superphosphate and triple superphosphate. The phosphorus concentration in the fertilizer is generally referred to as available phosphoric acid, calculated as $P_2O_5$, that is soluble in water or ammonium citrate. Other sources of phosphoric acid are defluorinated phosphate rock, fused tri-calcium phosphate, calcium meta-phosphate and calcium-magnesium phosphate.

Suitable sources of potassium, reported as $K_2O$, are double suphate of potash magnesia, potassium chloride, in a highly purified form equivalent to 60–62 percent $K_2O$, or in a less highly refined form ordinarily equivalent to about 50 percent $K_2O$, potassium sulphate, and manure salts.

In addition to the primary fertilizer ingredients discussed above it may be desirable to add trace elements to the fertilizer measure. Ordinarily the primary fertilizer ingredients will incorporate sufficient quantities of calcium and sulfur into the fertilizer. Magnesium, iron, zinc, copper, boron and molybdenum can be added in small amounts. These trace elements are conveniently available in the form of fritted trace elements in which the elements are present principally as oxides. When the crude oil from which the petroleum pitch is prepared has substantial concentrations of metals, trace metals such as molybdenum or vanadium can be supplied directly by the pitch.

The fertilizer ingredients are dispersed in water before the water is mixed with the pitch in the preferred embodiment of this invention. Whether the fertilizer ingredients are dissolved in the water or suspended in an aqueous slurry will depend upon the particular fertilizer ingredients used, and the concentration of the fertilizer ingredients in the fertilizer product. The fertilizer ingredients, particularly those of limited solubility in water, are finely ground, for example, to particles passing through 100 mesh screens, before mixing with the water to permit the production of a powdered fertilizer with the fertilizer ingredients uniformly distributed throughout the particles. The concentration of the fertilizer ingredients in the aqueous dispersion may vary widely and will depend on the desired concentration of fertilizer ingredients in the final product. The fertilizer ingredients can also be dispersed directly in the liquid pitch and the dispersion subsequently mixed with water.

The petroleum pitch throughout which the fertilizer ingredients are incorporated is a heavy residual petroleum product which is solid at ordinary temperatures and has a softening point as determined by the ring and ball method (ASTM D-36) above about 275° F., preferably 300° F. or higher. The petroleum pitches are hard brittle solids at room temperatures, but they become soft and sticky at temperatures near their ring and ball softening point. If the pitches are subjected to pressure for long periods, there will be slight flow and caking of the pitches, even at temperatures well below the ring and ball softening point. The tendency to flow or cake decreases rapidly as the temperature differential between the softening point and the temperature of the pitch when exposed to the pressure increases. It is important, therefore, that the pitches used in the preparation of the fertilizers of this invention have high softening points to avoid caking or agglomeration of the fertilizer immediately after flashing to atmospheric pressure, or during subsequent storing.

The petroleum pitches can be obtained directly from a few very heavy, highly asphaltic crude oils such as crude oil obtained from the area around Baxterville, Mississippi, by an extremely deep vacuum distillation. Petroleum pitches can also be obtained from more paraffinic crude oils by a combination of deep vacuum distillation and severe visbreaking of the bottoms from the vacuum distillation, which may be followed by a second vacuum distillation or atmospheric flash distillation at high temperatures. The preparation of the petroleum pitches is described in application Serial No. 416,634 of Harold Beuther and Richard G. Goldthwait, filed March 16, 1954. The petroleum pitches are recovered in each of the processes as a liquid bottoms product at a temperature above about 500° F. and ordinarily above 600° F. from a distillation or other vapor-liquid separation. The preparation of the fertilizers according to this invention provides a method of solidifying the petroleum pitch in a finely divided easily handled form as well as for the preparation of the novel fertilizer.

Referring to the drawing, a mixing tank 10 equipped with an agitator 12 is provided for mixing the fertilizer ingredients and water to form an aqueous slurry or aqueous solution of the fertilizer ingredients for admixture with the pitch. The fertilizer ingredients and water are mixed in mixing tank 10 and the resultant mixture, for convenience hereinafter referred to as a slurry, is discharged through a line 14 from the bottom of the tank 10 for delivery to a pump 16. In the apparatus illustrated in the drawings, the pump 16 is of the reciprocating type but other types of pumps suitable for raising the slurry to the desired high pressures may be employed.

The pressure on the slurry discharged from the pump 16 is sufficiently high to maintain the major portion of the water in the liquid phase during the subsequent mixing with the pitch. The mixture of pitch and slurry will be at a temperature of about 450–700° F. and preferably between 500–600° F.; hence, the pressure on the slurry discharged from pump 16 is ordinarily in the range of 450–1600 p. s. i. but may be as high as the critical pressure of water.

The aqueous slurry is delivered from pump 16 through line 18 to a heat exchanger 20 in which the slurry is heated to a temperature which will give the desired temperature of the mixture of pitch and the slurry of fertilizer ingredients. In some instances the temperature of the pitch may be sufficiently high upon admixture with the slurry that it will heat the slurry to a temperature high enough, above 450° F., to keep the mixture in a fluid condition without preheating the aqueous slurry. Generally, it is desirable to heat the water to a temperature of about 400° F. before mixing with the pitch to facilitate the mixing. The slurry is discharged from the heat exchanger 20 through a line 22 for delivery to a mixer 24.

Liquid petroleum pitch at a temperature of about 500–800° F. is delivered either directly from the bottom of a distillation tower or from storage through a line 26 to a pump 28 which raises the pressure on the pitch to substantially the pressure of the slurry in line 22. The liquid pitch is discharged from the pump 28 through a line 30 into the line 22. If desired, line 30 can be arranged to discharge the molten pitch directly into the mixer 24 rather than into the line 22.

A wide range of ratios of the slurry to pitch can be employed. It is only essential that there be sufficient water present as a liquid in the dispersion of pitch and the slurry that vaporization of the water upon reduction of the pressure will extract enough heat from the pitch and fertilizer ingredients to solidify the pitch and cool it to a temperature low enough to avoid caking. Water in excess of that required to solidify the pitch is not a serious disadvantage unless sufficient excess water is used to cause water to drain from the fertilizer product and thereby leach fertilizer ingredients from the product. The amount of water will depend partly on the temperature of the pitch and water mixture before flashing. Ratios of water to pitch on a volume to volume basis from about 0.30:1 to about 2.0:1 can be used.

The molten pitch and slurry are thoroughly mixed at the high temperature and pressure in the mixer 24. Mixer 24 is illustrated in the drawings with a series of baffles to provide the desired mixing of the pitch and slurry. A series of orifices or other suitable mixing apparatus can also be used to produce the desired mixing.

It is important that the slurry and pitch be thoroughly mixed at the high temperature and pressure while a substantial portion of the water is in the liquid phase. A uniform dispersion, for example, an emulsion of the two liquids, is desired to ensure uniform cooling of the pitch by absorption of the heat of vaporization by the water. The uniform dispersion of pitch and slurry results in fertilizer particles that are substantially uniformly porous, caused by flashing of water to steam uniformly throughout the mass of the pitch.

The dispersion of the slurry and the pitch is discharged from mixer 24 through outlet line 32 and is throttled through a pressure control valve 34. The pressure control valve 34 maintains the pressure on the mixer 24 high enough to keep a substantial portion of the water present in the mixer in the liquid phase. The presence of steam in the mixer 24 is not objectionable as long as vaporization of water in the mixer 24 does not cool the mixture to a temperature at which the pitch is no longer fluid.

The mixture of pitch and slurry is discharged from the valve 34 at a reduced pressure and delivered through a nozzle 36 into a separator 38 maintained at substantially atmospheric pressure such as a pressure below about 25 p. s. i. g. The reduction in pressure causes flashing of water in the mixture to steam and a rapid drop in the temperature as the unvaporized materials give up heat for the vaporization. The greatly increased volume resulting from the flashing of the water causes the product to travel through nozzle 36 at a high velocity and in a highly turbulent state. Upon discharge into the separator, the water vapor is separated from the solidified fertilizer particles and discharged overhead through vent 40. The fertilizer particles drop to the bottom of the separator 38 and are removed therefrom through line 42. Air may be blown into the separator 38 through line 44 to cool the fertilizer product.

The fertilizer product of this invention is a highly porous particulate solid material that may easily be ground to finer particle sizes, if desired. By adjustment of the conditions at which the flashing of the water from the pitch and slurry mixture occurs, the particle size may be controlled in the range from fines to particles ½ to ¾ of an inch in diameter or even larger. The control can be accomplished by control of the temperature and pressure in the mixer, the water to pitch ratio or by the introduction of an inert gas into the mixer to increase the velocity of the material passing through nozzle 36. For example, by adjustment of the conditions to reduce the velocity in the nozzle 36, a continuous rope of roughly cylindrical shape which swells to about ½ inch in diameter can be extruded from a nozzle ⅛ inch in diameter. The rope swells, becomes distorted and breaks into segments as it is discharged into the separator, but like the finely divided particles is highly porous and brittle. At other conditions, notably higher velocities in the tubing, fines of about 1/16 inch in diameter and less can be discharged as discrete particles from a nozzle of the same size.

The following example illustrates a specific embodiment of this invention for the preparation of a novel fertilizer product containing approximately 2 percent nitrogen, 8 percent $P_2O_5$ and 8 percent $K_2O$.

A mixture of fertilizer ingredients is formed having the following compounds:

| Ingredient: | Pounds |
|---|---|
| Sodium nitrate, 16% nitrogen | 500 |
| Superphosphate, 19% $P_2O_5$ | 442 |
| Triple superphosphate 45% $P_2O_5$ | 524 |
| Potash 60% $K_2O$ | 534 |

The above mixture of fertilizer ingredients is mixed with water at the rate of 2000 pounds of the mixture per 2000 pounds of water to form a slurry which is heated to a temperature of 500° F. at a pressure of 1200 p. s. i. g. The hot slurry is introduced into a mixer at a rate of 7200 pounds per hour. Liquid petroleum pitch having a ring and ball softening point of 280° F. is introduced into the mixer at a temperature of 550° F. and a rate of 7200 pounds per hour. The mixer consists of an elongated section of tubing in which the turbulent flow of the liquids produces a thorough dispersion. The resulting mixture, at a temperature of approximately 500° F., is throttled through a valve and discharged into a separator at atmospheric pressure. Fertilizer particles are produced in the form of porous brittle fines.

The fertilizer ingredients in the novel fertilizer of this invention are disseminated substantially uniformly throughout the high porous pitch. The pitch thus provides an extremely thin waterproof coating over many of the surfaces of the particles of the fertilizer ingredients preventing rapid leaching of the fertilizer ingredients. The highly porous and brittle nature of the fertilizer results in easy fracture of the fertilizer particles to expose new surfaces of the fertilizer ingredients. Thus, the novel fertilizer of this invention prevents rapid leaching of the fertilizer ingredients but does not provide an unbreakable waterproof coating of substantial thickness which makes the fertilizer ingredients substantially completely unavailable to the plants. The pitch covers the surfaces of the fertilizer ingredients adequately to prevent the fertilizer becoming sticky or caking during storage.

We claim:

1. A fertilizer comprising a petroleum pitch having a ring and ball softening point above about 275° F. in a highly expanded porous condition and fertilizer ingredients uniformly disseminated throughout the pitch.

2. A fertilizer as set forth in claim 1 in which the fertilizer ingredients include nitrogen, phosphorus, and potassium-containing compounds.

3. A free-flowing non-hygroscopic fertilizer comprising finely divided fertilizer ingredients including nitrogen, phosphorus, and potassium-containing compounds disseminated throughout a porous, friable, solid petroleum pitch having a ring and ball softening point above about 275° F., said fertilizer being characterized by the slow release of water soluble ingredients and consisting principally of particles less than 1/8 inch in diameter.

4. A process for the preparation of fertilizers comprising mixing fertilizer ingredients dispersed in water with petroleum pitch having a softening point above about 275° F. at a temperature and pressure at which the pitch and water are in the liquid state to form a substantially uniform suspension of pitch, water and fertilizer ingredients, and rapidly reducing the pressure on the suspension to evaporate water therefrom and thereby cool and solidify the pitch in the form of porous, friable particles with fertilizer ingredients disseminated throughout the particles.

5. A process for the preparation of fertilizers comprising mixing a slurry of fertilizer ingredients dispersed in water with liquid petroleum pitch at an elevated temperature in the range of 450–700° F. and an elevated pressure above 450 p. s. i., said petroleum pitch having a ring and ball softening point above about 275° F., agitating the mixture of the petroleum pitch and the slurry at the conditions of elevated temperature and pressure to form a substantially uniform suspension of liquid petroleum pitch and slurry, and flashing the suspension to approximately atmospheric pressure whereby evaporation of water cools and solidifies the pitch in the form of porous, friable particles and deposits the fertilizer ingredients substantially uniformly throughout the pitch particles.

6. A process for the preparation of fertilizers comprising mixing liquid petroleum pitch and a slurry of fertilizer ingredients dispersed in water at a temperature in the range of 500–600° F. and a pressure above about 700 p. s. i., said petroleum pitch having a ring and ball softening point above about 275° F., the ratio of the water to the pitch being in the range of about 0.30:1 to 2.0:1, and flashing the resultant mixture to approximately atmospheric pressure whereby evaporation of the water cools and solidifies the pitch to form porous highly expanded pitch particles having fertilizer ingredients incorporated therein.

7. A process for the preparation of fertilizers comprising mixing fertilizer ingredients dispersed in water with petroleum pitch having a softening point above about 275° F., controlling the concentrations of the fertilizer ingredients and the ratios of the fertilizer ingredients to one another and to the petroleum pitch to produce a fertilizer of the desired composition, agitating the petroleum pitch and the slurry at a temperature above about 450° F. and a pressure above about 450 p. s. i., and flashing the mixture to substantially atmospheric pressure to form friable, porous pitch particles having the fertilizer ingredients disseminated therethrough.

8. A process as set forth in claim 7 in which the ratio of water to pitch in the mixture is in the range of about 0.30:1 to 2.0:1.

9. A process for the preparation of fertilizers comprising mixing fertilizer ingredients dispersed in water with petroleum pitch at a temperature in the range of 500–600° F. and a pressure in the range of 700–1600 p. s. i., said petroleum pitch having a ring and ball softening point above about 275° F., throttling the resulting mixture of pitch, fertilizer ingredients and water through a control valve whereby substantial quantities of the water are vaporized, passing the mixture after the throttling through an elongated nozzle at conditions of high velocity and turbulence, and rapidly discharging the mixture to substantially atmospheric pressure to vaporize additional water, cool the pitch to form friable, porous particles, and separate water vapor from the porous fertilizer particles comprising pitch having fertilizer ingredients substantially uniformly disseminated throughout the particles.

10. A process for the preparation of fertilizers comprising mixing water, fertilizer ingredients including nitrogen-, phosphorus-, and potassium-containing compounds, and a petroleum pitch having a ring and ball softening point above about 275° F. at a temperature of 450–700° F. and a pressure of 450–3200 p. s. i. at which a substantial portion of water is in the liquid state, and flashing the resulting mixture to substantially atmospheric pressure whereby vaporization of the water absorbs heat from the pitch and fertilizer ingredients to cool the pitch and fertilizer ingredients below the softening point of the pitch to form a friable, porous granular fertilizer product having fertilizer ingredients substantially uniformly disseminated throughout the pitch.

11. A fertilizer comprising a petroleum pitch having a ring and ball softening point above about 275° F. and fertilizer ingredients in fine particles, said petroleum pitch being porous and friable and forming a continuous phase with the fertilizer ingredients disseminated through said continuous phase.

12. A process for the preparation of fertilizer comprising mixing superphosphate dispersed in water with petroleum pitch having a softening point above about 275° F. at a temperature and pressure at which the pitch and water are in the liquid state to form a suspension of pitch, water, and fertilizer ingredients, flashing the mixture to substantially atmospheric pressure to evaporate water rapidly therefrom and thereby cool and solidify the pitch in the form of friable porous particles with superphosphate disseminated throughout the particles.

References Cited in the file of this patent
UNITED STATES PATENTS 1,255,829    Blumenberg _____ Feb. 5, 1918